United States Patent [19]
Anderson

[11] 3,761,578
[45] Sept. 25, 1973

[54] METHOD OF PREPARING PURIFIED LITHIUM ALUMINUM CHLORIDE

[76] Inventor: Scott Anderson, 1116 W. Church St., Champaign, Ill. 61820

[22] Filed: Mar. 9, 1972

[21] Appl. No.: 233,088

[52] U.S. Cl. .................. 423/463, 423/116, 423/472, 136/155
[51] Int. Cl. .................. C01d 11/02, C01f 7/56
[58] Field of Search .................. 423/463, 472, 499, 423/116, 115, 197; 252/364; 204/68; 136/83 R, 155, 154

[56] References Cited
UNITED STATES PATENTS
| | | | |
|---|---|---|---|
| 3,415,687 | 12/1968 | Methlie | 136/83 R |
| 3,532,543 | 10/1970 | Nole et al. | 136/154 X |
| 3,533,853 | 10/1970 | Gabano | 136/155 |

*Primary Examiner*—Edward Stern
*Attorney*—L. Lawton Rogers, III et al.

[57] ABSTRACT

Purified lithium aluminum chloride ($LiAlCl_4$) is prepared by passing hydrogen chloride gas through a melt of lithium aluminum chloride containing impurities such as water, hydroxides or other inorganic oxygen-containing salts, carbon and iron, to remove at least a portion of the water and oxygen-containing impurities. Thereafter, the melt is heated to a temperature of from about 425° to about 540° C. and chlorine gas is passed through the melt to remove carbon impurities. The melt is cooled to about 190°C. to 260° C. and contacted with aluminum to replace the iron in solution because of its higher electrochemical potential. The purified melt is filtered and cooled. Analysis of a typical product shows less than 300 parts per billion of impurities. The starting lithium aluminum chloride may advantageously be prepared by melting admixture of reagent grade lithium chloride and reagent grade aluminum chloride. Mixture of lithium aluminum chloride and aluminum chloride can be prepared using an excess of reagent grade aluminum chloride reactant.

38 Claims, 2 Drawing Figures

METHOD OF PREPARING PURIFIED LITHIUM ALUMINUM CHLORIDE

BACKGROUND OF THE INVENTION

Lithium aluminum chloride ($LiAlCl_4$) is a low melting salt which may advantageously be utilized in a non-aqueous power source such as thermal batteries and primary or secondary cells, as a low melting point solvent in spectroscopy and in other areas suitable for use with low melting point salts.

However, commercial development and use of lithium aluminum chloride in any substantial amounts has been hindered due at least in part to the unavailability of a highly purified, preferably water-white colored, product. Lithium aluminum chloride, which may be made by the combination of materials such as reagent grade lithium chloride and reagent grade aluminum chloride, may contain substantial amounts of impurities such as water, oxygen containing impurities such as hydroxides or other inorganic metal salts, carbon (from a carbonaceous solvent or carbon reactant which may be used to manufacture the reagent grade material), and metals such as iron. Lithium aluminum chloride manufactured in this manner is generally discolored, e.g., it may have an off-white color dependent upon impurity type and content.

Purification of lithium aluminum chloride is difficult due to the differing nature of the various impurities. Often, a treatment suitable for the removal of one type of impurity will not remove any other type and may make removal of other types more difficult. Also, aluminum chloride has a high vapor pressure at atmospheric pressure and thus may vaporize from the lithium aluminum chloride, particularly as the temperature of the material is increased. Aluminum chloride lost from lithium aluminum chloride results in excess lithium chloride which is difficult to separate from the desired product. Thus, treatments at elevated temperature designed to remove one or more impurities may result in the formation of another impurity and promote the loss of the desired product.

It is accordingly an object of this invention to provide a novel process for purifying and for manufacturing purified lithium aluminum chloride.

It is also an object of this invention to provide a novel process for purifying and for manufacturing a mixture of purified lithium aluminum chloride and aluminum chloride.

It is another object of this invention to provide a novel process for purifying and for manufacturing lithium chloride and mixtures thereof with aluminum chloride purified to an essentially water-white color.

It is still another object of this invention to provide a novel process for the manufacture of purified lithium aluminum chloride and mixtures thereof with aluminum chloride starting from reagent grade lithium chloride and aluminum chloride.

It is further an object of this invention to provide a novel process for the purification and for the manufacture of lithium aluminum chloride and mixtures thereof with aluminum chloride without substantial vaporization of aluminum chloride.

These and many other objects and advantages of the invention will be apparent from the claims and from the following detailed description when read in conjunction with the appended drawings. In general, the process comprises heating lithium aluminum chloride having oxygen containing water, carbon and iron impurities contained therein to a temperature above the melting point of lithium aluminum chloride; passing hydrogen chloride gas through the molten lithium aluminum chloride to convert at least a portion of the oxygen containing impurities to water and volatile impurities and to remove at least a portion of the water and volatile impurities by scrubbing; heating the scrubbed lithium aluminum chloride to a temperature of from about 425° to 540° C. while passing chlorine gas therethrough to remove at least a portion of the carbon impurities contained therein; cooling said resulting molten lithium aluminum chloride to a temperature of from about 160° to 250° C; passing a heavy inert gas through the molten lithium aluminum chloride to remove at least a portion of volatile impurities contained therein; contacting said molten lithium aluminum chloride with aluminum to remove at least a portion of the iron impurities; and cooling the purified lithium aluminum chloride.

DETAILED DESCRIPTION

Figures 1, 2:
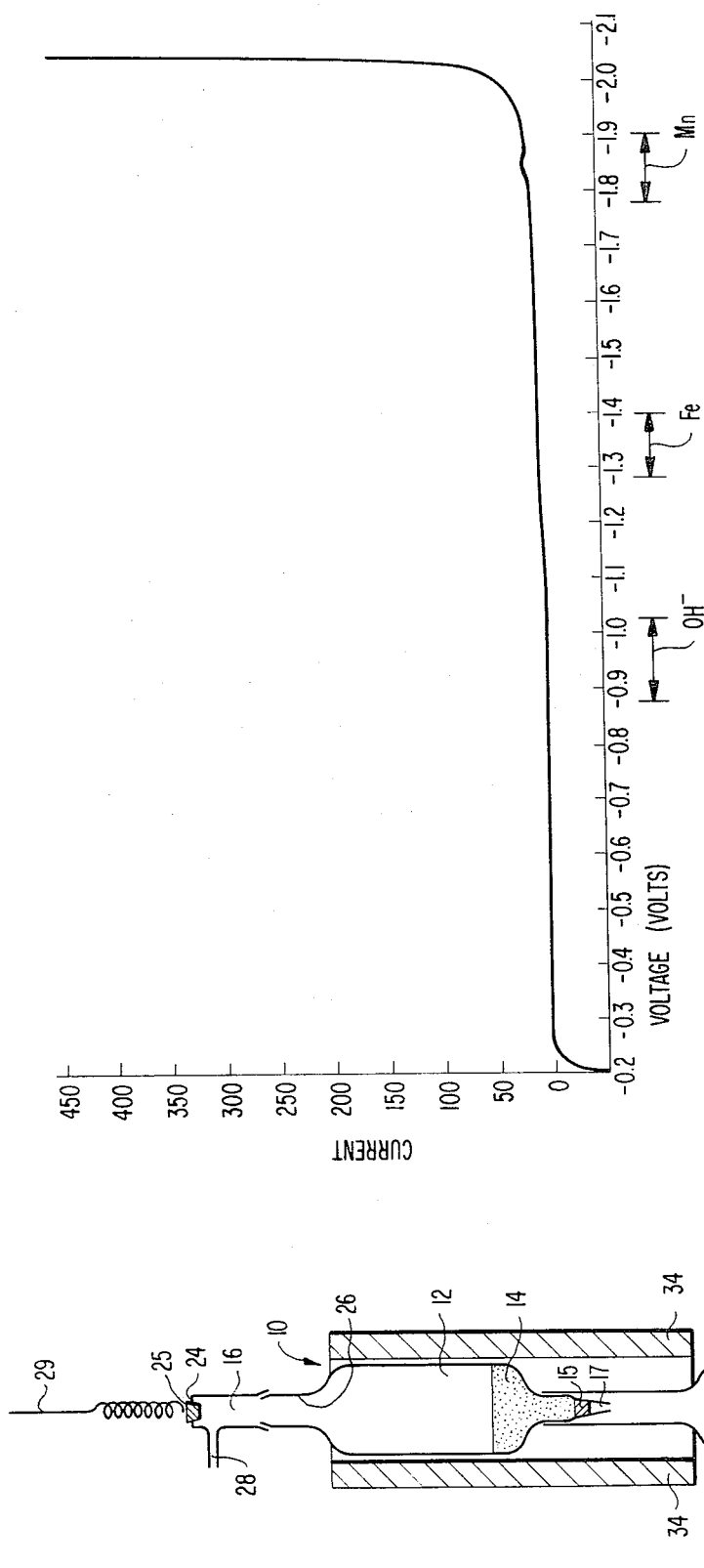
FIG. 1 is a schematic representation of apparatus which may be utilized for producing purified lithium aluminum chloride in accordance with the present invention; and, FIG. 2 is a representation of a typical polarogram taken of a purified lithium aluminum chloride product formed by the process of this invention.

Referring to FIG. 1, a purification vessel 10 made of an inert material such as quartz or nickel has an upper section 12 for holding a metal salt 14 which may be lithium aluminum chloride or an admixture of lithium chloride and aluminum chloride as explained hereinbelow. The vessel 10 may be provided with an outlet 16 at the uppermost end thereof for the egress of various gases therefrom. The outlet 16 may contain an opening 24 in which a stopper means 25 may be removably disposed to allow ingress of aluminum such as aluminum foil or a coiled wire 29 as described hereinbelow. The upper section 12 of the vessel means 10 may be hermetically sealed in axial relationship with a lower section 19 which comprises a gas inlet 20, a collecting chamber 22, and one or more collection vials 30. A conventional furnace 34 is shown schematically as the means for raising the temperature of the salt 14 above the melting point of lithium aluminum chloride (i.e., above about 150° C.) and for maintaining the salt molten as it is purified and as it passes from the upper section 12 into the lower section 18 of the purification vessel 10. Brackets 19 may be affixed to the lower section 18 of the vessel 10 to hold the vessel 10 in an upright or vertical position. The collecting chamber 22 may include collection vials 30 so that the molten salt may fall through the chamber 22 into the collection vials 30.

Auxiliary apparatus (not shown) may include tanks containing hydrogen chloride gas, chlorine gas and inert gases such as argon or neon as well as appropriate piping and valves to pass these gases through the molten salt in the manner described hereinbelow.

Similarly, gas purifying apparatus (not shown) such as charcoal beds, desiccants, reducing agent beds and the like may be provided to remove any hydrocarbon, water and/or oxygen impurities from the gases prior to their introduction into the lower section 18 of the purification vessel 10.

The upper section 12 of the purification vessel 10 may have in its lower portion a silica frit or sintered metal filter 15 having an average pore size of from about 40 microns to about 150 microns disposed immediately above a funnel or nozzle 17.

In operation, lithium aluminum chloride salt or an admixture or reagent grade lithium chloride and reagent grade aluminum chloride may be placed in the upper section 12 of the vessel 10 atop the silica frit or sintered metal filter 15. It is preferred that an admixture of reagent grade lithium chloride and reagent grade aluminum chloride be used as the starting material and the following description will relate to the use of the admixture.

Reagent grade salts such as lithium chloride and aluminum chloride usually contain about from 0.2 to about 0.3 percent by weight of impurities. Generally, these impurities are in the form of oxygen containing inorganic salts such as hydroxides, sulfates, nitrates, etc., and/or water. The reagent grade salts often also contain carbon as an impurity since reagent grade salts are often formed in a carbonaceous solvent. Also, aluminum chloride may be formed in the presence of a carbonaceous reactant. Iron is often present in the form of iron chloride.

The lithium chloride and aluminum chloride reactants may be admixed in a ratio which will yield the desired lithium aluminum chloride product. Generally, the reactants will be admixed in a 1:1 molar ratio although an excess of either reactant may be present in the reaction mixture. In general, up to about 55 percent by weight excess aluminum chloride or up to about 5 percent excess lithium chloride based on the total weight of that component in the stoichiometric admixture, may be present in the admixture. However, lithium chloride, if present in excess of that necessary to form the lithium aluminum chloride product may precipitate and make separation of the product difficult.

As noted before, aluminum chloride has a high vapor pressure at atmospheric pressure and may sublime or vaporize from the admixture. This loss of aluminum chloride may result in the admixture having an excess of lithium chloride with the resultant precipitation and separation problems. An excess of aluminum chloride is thus preferable and a slight, e.g., from about 0.2 to 2 percent by weight excess of aluminum chloride is most preferable when forming lithium aluminum chloride.

The lithium chloride and aluminum chloride reagents may be admixed in any manner suitable to form an intimate dispersion of the materials. For example, the reagent grade salts may be ball milled for a time sufficient to intimately mix the materials, e.g., from about 1 hour to about 4 hours.

The admixture may then be outgassed to remove as much volatiles, e.g., free water or the like, as possible by evacuating the atmosphere surrounding the melt to a subatmospheric pressure of from about 0.01 to 0.001 millimeters of mercury. Outgassing is preferably conducted at about room temperature (about 20° C.) to prevent undue vaporization of the aluminum chloride and for a time sufficient to remove at least a portion of volatile impurities contained therein, e.g., from about 1/2 to 16 hours, with the volatile gases being vented from the vessel 10 through the outlets 16 and 20.

Following the outgassing, hydrogen chloride gas from a tank (not shown) may then be passed through the salt 14 by way of conduit 20 into the lower section 18 of purification vessel 10 with sufficient pressure below the filter 15 to force the gas up through the nozzle 17, through the salt 14, and then out of the upper section 12 of the purification vessel 10 through the outlet 16.

While the gas mixture is flowing through the salt 14, the temperature of the salt may be raised above the melting point of lithium aluminum chloride (i.e., about 150° C.) and preferably from about 10° C. to about 25° C. above the melting point of the salt, e.g., to a temperature of from about 160° C. to about 175° C. During melting, the hydrogen chloride gas mixture tends to remove water by a scrubbing or stripping action, to convert hydroxides to the corresponding chlorides and water, and to convert sulfates to the corresponding chlorides, water and hydrogen sulfide. Preferably, a positive atmospheric pressure, i.e., 2 to 3 psig or more is maintained on the top of the melt to inhibit the loss of aluminum chloride. When the salt 14 is an admixture of lithium chloride and aluminum chloride, lithium aluminum chloride forms as the materials melt.

The lithium aluminum chloride melt may be contacted with the hydrogen chloride gas for a time sufficient to remove at least part of the oxygen containing impurities contained therein, which generally will be for up to about 15 minutes after the salt 14 has been melted. The lithium aluminum chloride melt generally has a very dark, essentially black, color. The coloration is thought to be due at least in part to the presence of colloidal carbon impurity particles dispersed throughout the melt. These particles have been found to be of a size very difficult to filter from the melt. The black coloring may also be due in part to the presence of hydrogen chloride in the melt. Black or dark colored lithium aluminum chloride is unsuitable for certain uses such as spectroscopy where an essentially water-white color is desirable.

The dark or black colored lithium aluminum chloride melt 14 may then be clarified to an essentially water-white color. Clarification may be accomplished by purification of the melt to a very high degree, e.g., less than about 1,000 and preferably less than about 500 parts per billion of impurities, and particularly to remove discoloring impurities such as carbon and iron and dissolved or entrapped volatile impurities such as hydrogen chloride.

The lithium aluminum chloride melt may contain some dissolved water and dissolved gases which it is desirable to remove. The dissolved water and gases may be removed by evacuation of the melt to subatmospheric pressures, e.g., about 22 to 24 inches of mercury for from about 1/2 hour to about 1 hour.

Chlorine gas may then be passed from a tank (not shown) through the melt 14 by way of conduit 20 into the lower section of 18 of the purification vessel 10 with sufficient pressure below the filter 15 to force the gas up through the nozzle 17, the melt 14 and then out of the upper section 12 of the purification vessel 10 through the outlet 16. A positive pressure (e.g., 1 to 4 psig) may be maintained in the upper section 12 of the vessel 10 above the melt 14 to prevent or inhibit the loss of aluminum chloride.

While the chlorine gas is flowing through the melt, the temperature of the melt may be raised to a temperature in the range of from about 425° C to about 540°

C., preferably from about 480° C to about 540° C. The melt may be maintained at that temperature with the chlorine gas passing therethrough until the melt is clarified and until substantially all of the dark, discoloring impurities contained therein are removed. Clarification is also shown by the change in color of the melt from the dark or black color to an amber (essentially yellow-orange) color. It is believed that the colloidal dispersion is the probable cause of the dark color and that the carbon is oxidized by the chlorine gas. It will be understood by those skilled in the art that the term "removed" as used herein includes not only a physical removal of the impurity from the melt at a particular point but also the conversion of that impurity to a form or compound which is removed in subsequent steps of the process. The resulting amber color of the melt may be caused by dissolved chlorine or iron compounds or complexes in the melt.

During operation of the process in a vessel 10, condensates may form on the wall 26 of the upper section 12. Similarly, condensates may form on the wall 28 of tubing connected to the outlet 16. These deposits may also show color changes during clarification. For example, deposits on the wall 26 generally become yellow in color as the melt is clarified and the condensate on the wall 28 becomes purple in color. These color changes are thought to be due to the evolution from the melt of impurity compounds which react with the earlier deposits.

Clarification of the black-colored melt does not take place below about 425° C. and substantial evaporation of aluminum chloride may take place at temperatures above about 540° C. It is, therefore, necessary to heat the melt to a temperature of between about 425° to about 540° C., preferably from about 480° C. to about 540° C. The melt may be maintained at a temperature of from about 425° C. to about 540° C. for a time of from about 2 minutes up to about 1 hour and preferably may be maintained at a temperature of from about 480° C. to about 540° C. for a time of from about 2 minutes up to about 1/2 hour.

The clarified melt may then be cooled to a temperature of from about 160° C. to about 260° C., preferably from about 190° C. to about 210° C., while the chlorine gas is still flowing therethrough.

The passing of the chlorine gas through the melt 14 may be ceased when the melt has cooled to a temperature in the range of from about 190° C. to about 260° C. The cooled, clarified melt may also contain some dissolved gases (such as dissolved chlorine gas) which are desirably removed. The melt may then be subjected to an evacuation at subatmospheric pressures, e.g., about 22 to 24 inches of mercury, to evacuate at least some of the dissolved gases contained therein. At least a portion of any volatile impurity may be thereby removed.

The melt may then be scrubbed with a heavy inert gas such as argon or neon. The evacuations may be accomplished by applying a partial differential vacuum to keep the melt on top of the silica frit, to the outlet 16 and the inlet 20 of the purification vessel 10, with scrubbing being accomplished by feeding the inert gases in through the inlet 20 and out through the outlet 16. It is often advantageous to repeat the steps of evacuation and inert gas scrubbing to essentially remove all volatile impurities contained therein as well as to remove all halide gases within the reactor system. For example, three to 20 evacuations with subsequent scrubbing, preferably five to six evacuations with subsequent scrubbing, may be sufficient to remove substantially all of the dissolved gases in the molten salt.

Argon or neon gases are suitable for use in the scrubbing step of the process of the present invention. Light inert gases such as helium have been found unsuitable since the helium molecules are too light to remove chlorine molecules.

While the inert gas is flowing through and stirring the melt, the stopper means 25 may be removed and the melt contacted with aluminum 29 inserted through opening 24 to remove the discoloring impurities contained in the melt whereby the melt may become essentially water-white in color. The aluminum is desirably in a solid form adapted to be in intimate contact with the melt and removeable therefrom without substantially disturbing the melt. The aluminum may be in the form of aluminum foil, coiled wire, strips or the like. After an induction period, generally of from about 1/4 to about 1/2 hour, the aluminum may become black in color and the melt becomes essentially water-white in color.

The induction period is believed necessary for the melt to break through the oxide film which naturally occurs on the surface of the aluminum and to contact the aluminum. Aluminum has a higher electrochemical potential than impurities such as iron and is thought to replace the iron and other impurity metals having a lower electrochemical potential in the melt. The black coating on the aluminum may be the deposit or formation of metals (primarily iron) having an electrochemical potential lower than aluminum.

The aluminum may be removed from the purified, essentially water-white melt and out of vessel 10 through opening 24 after the discoloring impurities have been removed, which generally will be after a total contact time of from about 1/2 to about 1 hour. If the aluminum is retained in the melt for longer periods, bits of the aluminum as well as bits of the black coating may become dispersed in the melt. Stopper means 25 may be inserted into the opening 24 after the aluminum 29 is removed from the vessel 10.

Following the above purification steps, the melt may be filtered and removed from the purification vessel.

A suitable filter such as a silica frit filter 15 having a porosity of from about 40 microns to about 150 microns may be provided in the funnel or nozzle 17 for removing insoluble impurities which may be present in the melt.

Thereupon, an inert gas such as argon or neon may be put into the collector section 22 and into the upper section 12 above the melt 14 so that the melt is forced downwardly through the nozzle 17 as a jet, i.e., as a continuous stream and not dropwise, to speed collection in collection vials 30.

The resultant product, lithium aluminum chloride, has essentially no iron or carbon impurities and is extremely low in other oxygen-containing impurities such as water, hydroxides or the like. It has been found, for example, that the process of the present invention may be utilized to produce lithium aluminum chloride having less than 500 parts per billion of total impurities, often less than about 300 parts per billion of impurities.

The purified, water-white colored lithium aluminum chloride produced by the present invention may be utilized in spectroscopy as a low-melting point solvent, in non-aqueous power sources such as thermal batteries and primary and secondary cells, or in any use in which a low-melting, high purity water-white colored salt is desired.

The invention is additionally illustrated in connection with the following examples which are to be considered as illustrative of the present invention. It should be understood, however, that the invention is not limited to the specific details of the Examples.

EXAMPLE I

Purified, essentially water-white colored lithium aluminum chloride has been prepared from reagent grade lithium chloride and reagent grade aluminum chloride salts using the method of the present invention as described above.

The lithium chloride salt originally contained hydroxide impurities in an amount of 300 parts per million (p.p.m.), water in an amount of 3,000 p.p.m. and a total impurity content of about 3,500 p.p.m. The aluminum chloride salt originally contained 2,000 p.p.m. hydroxide impurities, 2,000 p.p.m. water and 4,200 p.p.m. total impurities.

About 2,550 grams (5.69 moles) of aluminum chloride and 810 grams (5.5 moles) of lithium chloride were charged into a ball mill and mixed for about 4 hours to achieve a uniform admixture of the salts. This admixture contained about 1 weight percent aluminum chloride in excess of that necessary to stoichiometrically form lithium aluminum chloride. The uniform admixture was placed into a vessel and outgassed at a temperature of about 24° C. and a vacuum of about 0.001 millimeters of mercury overnight to remove at least a portion of the residual gases (primarily water) contained within the admixture of salts.

The outgassed admixture was placed into the melt section of the vessel 10 and heated to a temperature of about 160° C. Hydrogen chloride gas was passed into the vessel and through the admixture as it was being heated. The admixture of salts melts and forms the compound lithium aluminum chloride which has a melting point of about 150° C. A positive pressure of about 2 to about 3 psig was maintained on top of the melt in the upper section 12 of the vessel 10 to inhibit the loss of aluminum chloride by vaporization.

The hydrogen chloride removed at least a portion of the oxygen-containing impurities such as water and inorganic salts (hydroxides and the like) from the melt. The gas was passed through the melt for about 10 minutes after the lithium aluminum chloride was formed. The lithium aluminum chloride had a very dark color thought to be due in part to a colloidal dispersion of fine carbon particles too small to filter.

Hydrogen chloride passage was ceased and the melt again subjected to an outgassing by evacuating the atmosphere surrounding the melt to a vacuum of about 22 to 24 inches of mercury to remove at least some of the hydrogen chloride gas or other volatile impurities in the melt.

Chlorine gas was then passed into the vessel 10 and passed through the melt with a positive pressure of about 2 to about 3 psig maintained across the top of the melt to inhibit aluminum chloride vaporization. While the chlorine gas was flowing through the melt, the temperature of the melt was increased to about 510° C. A purple color was observed at about 460° C. in the deposits on the walls 28 of the tubing attached to the outlet part 16 from the reactor. The black colored melt became progressively lighter and a reddish-amber color was achieved after about 10 minutes. No further color change took place thereafter. Apparently, the chlorine gas reacted at this temperature with the dispersed carbon impurity particles to oxidize and remove the carbon.

It is noted that a condensation which formed on the wall 26 in the top portion 12 of the vessel 10 became a bright yellow as the melt was being clarified.

The reddish-amber colored melt was cooled to about 240° C. while the chlorine gas was flowing therethrough. The color of the melt changed slightly to a yellowish-amber color at the lower temperature. Chlorine gas passage was ceased and the melt was again outgassed by applying a vacuum of about 22 to 24 inches of mercury to remove at least a portion of the chlorine gas or other volatile impurities entrapped or otherwise contained in the melt and in the reactor system.

Argon gas was passed through the melt for about 15 minutes to remove substantially all of the volatile impurities contained in the melt.

While argon was flowing through and stirring the melt, stopper means 25 was removed from opening 24 and pieces of aluminum foil 29 were inserted into the melt. After an induction period of about 1/4 hour, the aluminum surface became darker and the color of the melt became lighter. Within about another 1/4 to 1/2 hour, the melt had become essentially water-white in color and the aluminum was coated with a dark, essentially black, deposit. Some black color particles became dispersed in the melt. The passage of the argon gas through the melt was ceased and a positive pressure differential of about 1 psi of argon was applied to the top of the melt, which forced the melt through a No. 2 porosity (about 40 to 90 microns) silica filter and into collection vials 30 for ultimate recovery. An argon gas atmosphere was maintained in the collection chamber 22.

The product was analyzed in a known manner to determine the impurity level and it was found that the product contains essentially no hydroxide impurities and was extremely low in iron and manganese impurities. The total impurity content of the product was less than 260 parts per billion.

FIG. 2 illustrates a polarograph taken of the purified lithium aluminum chloride product. This polarograph was made in accordance with techniques known to those skilled in the art. There are characteristic ranges of voltages for certain impurities such as iron, manganese and hydroxide impurities which ranges are generally indicated in FIG. 2. A constant current value across a given impurity voltage range indicates that this impurity is essentially not present. The polarograph of FIG. 2 shows essentially no hydroxide was present in the purified product and that iron and manganese were present in extremely small quantities.

EXAMPLE II

The procedure of Example I was repeated with a starting mixture of 990 grams aluminum chloride and 210 grams lithium chloride which mixture thus contained about 50 weight percent aluminum chloride in excess of that necessary to form lithium aluminum chloride.

The process was repeated in the same manner as in Example I which was the eutectic composition of about 14 mole percent aluminum chloride and about 86 mole percent lithium aluminum chloride, and where the aluminum was in the form of the coiled wire 29. The resultant product contained less than about 300 parts per billion total impurities.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention as defined by the language of the appended claims when accorded a full range of equivalents.

I claim:

1. A method of manufacturing purified lithum aluminum chloride which comprises:
   a. heating an admixture of impurity-containing lithium chloride and aluminum chloride at a temperature above the melting point of lithium aluminum chloride to form a melt of lithium aluminum chloride;
   b. passing hydrogen chloride gas through the said melt for a time sufficient to remove at least a portion of any oxygen-containing impurities present therein;
   c. passing chlorine gas through the melt while heating the melt to a temperature of from about 425° to about 540° C., and maintaining the melt at the said temperature with chlorine gas flowing therethrough until said melt is clarified;
   d. cooling said clarified melt to a temperature of from about 160° to 260° C. while maintaining the chlorine gas flowing therethrough;
   e. stopping the flow of and removing chlorine gas.
   f. flowing argon or neon gas through the said cooled, clarified melt to remove at least a portion of any volatile impurity present therein and contacting said melt while said argon or neon gas is flowing therethrough with aluminum metal for a time sufficient to remove impurities therefrom and;
   g. cooling the said purified lithium aluminum chloride in an inert atmosphere.

2. The method of claim 1 wherein said lithium chloride and aluminum chloride are admixed in a ball mill prior to being melted.

3. The method of claim 1 wherein said admixture is outgassed in a vacuum at about room temperature for about 1/2 to about 16 hours prior to being melted.

4. The method of claim 1 wherein hydrogen chloride gas is passed through the said mixture while it is being heated above the melting point of lithium aluminum chloride.

5. The method of claim 1 wherein the hydrogen chloride gas is passed through the lithium aluminum chloride melt for a time of up to about 15 minutes.

6. The method of claim 1 wherein the said melt after the hydrogen chloride gas has been stopped is subjected to a vacuum sufficient to remove at least a portion of any volatile impurity present therein.

7. The method of claim 1 wherein the said admixture contains up to about 55 weight percent excess of aluminum chloride.

8. The method of claim 7 wherein the said admixture contains from about 0.2 to 2 weight percent excess of aluminum chloride.

9. The method of claim 1 wherein said melt is maintained at said temperature of from about 425° to about 540° C. for a time of from about 2 minutes up to about 1 hour.

10. The method of claim 9 wherein said melt is maintained at said temperature of from about 480° to about 540° C. for a time of from about 2 minutes up to about 1/2 hour.

11. The method of claim 1 wherein the said clarified melt after the chlorine gas has been stopped is subjected to a vacuum sufficient to remove at least a portion of any volatile impurity present therein.

12. The method of claim 1 wherein said aluminum metal is in the form of foil.

13. The method of claim 1 wherein said aluminum metal is in the form of a coiled wire.

14. The method of claim 1 wherein said melt is contacted with the said aluminum metal for from about 1/4 to about 1 hour.

15. The method of claim 1 wherein the said purified lithium aluminum chloride is filtered prior to being cooled.

16. A process for producing purified, water-white colored lithium aluminum chloride which comprises:
   melting an admixture of lithium chloride and aluminum chloride in about 1:1 molar ratio to a temperature above the melting point of lithium aluminum chloride to form a melt of lithium aluminum chloride;
   passing through the melt hydrogen chloride gas to convert at least a portion of any oxygen-containing impurities other than water present in the melt to water and to remove at least a portion of the said water by scrubbing, the resultant melt being black-colored;
   ceasing passage of the hydrogen chloride gas;
   passing through the melt chlorine gas and heating the melt to a temperature of about 425° to 540° C. to remove at least a portion of the impurities causing the black color in the melt whereby the resultant melt is amber-colored;
   cooling the amber-colored melt while the chlorine gas is being passed therethrough to a temperature of from about 160° C to about 260° C.;
   ceasing passing of the chlorine gas and passing argon or neon gas therethrough at the said temperature;
   contacting the said amber-colored melt at the said temperature and while the said argon or neon gas is being passed therethrough with aluminum metal for a time sufficient to clarify the said amber-colored melt to a water-white colored melt;
   cooling the purified, water-white colored lithium aluminum chloride.

17. A process for making purified lithium aluminum chloride which comprises:
   heating lithium aluminum chloride having oxygen-containing water, carbon and iron impurities contained therein to a temperature above the melting point of lithium aluminum chloride;
   passing hydrogen chloride gas through the molten lithium aluminum chloride to convert at least a portion of the oxygen containing impurities to water and volatile impurities and to remove at least a portion of the water and volatile impurities by scrubbing;

heating said molten lithium aluminum chloride to a temperature of from about 425° C to 540° C while passing chlorine gas therethrough to remove at least a portion of the carbon impurities contained therein;

cooling said resulting molten lithium aluminum chloride to a temperature of from about 160° C to 250° C;

passing argon or neon gas through the molten lithium aluminum chloride to remove at least a portion of volatile impurities contained therein;

contacting said molten lithium aluminum chloride with aluminum metal to remove at least a portion of the iron impurities; and cooling the purified lithium aluminum chloride.

18. The process of claim 17 wherein said lithium aluminum chloride is formed by heating an admixture of about 1:1 molar ratio of lithium chloride and aluminum chloride to a temperature above the melting point of lithium aluminum chloride.

19. The process of claim 17 further comprising evacuating the atmosphere surrounding the said molten lithium aluminum chloride prior to passing the chlorine gas therethrough.

20. The process of claim 17 further comprising evacuating the atmosphere surrounding the said molten lithium aluminum chloride prior to passing the argon or neon gas therethrough.

21. The process of claim 20 wherein said steps of evacuating the atmosphere surrounding said molten lithium aluminum chloride and passing the argon or neon gas therethrough are repeated until substantially all the dissolved gases contained therein are removed.

22. The process of claim 17 wherein said aluminum metal is in the form of aluminum foil, strip or wire.

23. A method of manufacturing purified lithium aluminum chloride which comprises:
   a. heating an admixture of impurity containing lithium chloride and aluminum chloride to a temperature above the melting point of lithium aluminum chloride to form a melt of lithium aluminum chloride;
   b. passing hydrogen chloride gas through the melt for a time sufficient to remove at least a portion of the impurities present therein;
   c. clarifying the melt by passing chlorine gas through the melt at a temperature of from about 425° C. to about 540° C.;
   d. cooling the clarified melt to a temperature of from about 160° to 260° C. while passing chlorine gas therethrough; and,
   e. contacting the melt with aluminum metal while a heavy inert gas is flowing therethrough for a time sufficient to remove impurities therefrom.

24. The method of claim 23 wherein the lithium chloride and aluminum chloride are admixed in a ball mill prior to being melted.

25. The method of claim 23 wherein the hydrogen chloride gas is passed through the lithium aluminum chloride melt for a time of up to about 15 minutes.

26. The method of claim 23 wherein said melt is clarified at said temperature of from about 425° C. to about 540° C. for a time of from about 2 minutes up to about 1 hour.

27. The method of claim 23 wherein the aluminum is in the form of foil.

28. The method of claim 23 wherein the aluminum metal is in the form of a coiled wire.

29. The method of claim 23 wherein the melt is contacted with the aluminum metal for from about 1/4 to about 1 hour.

30. The method of claim 23 wherein the purified lithium aluminum chloride is filtered prior to being cooled.

31. The method of claim 25 wherein the aluminum is in the form of foil.

32. The method of claim 26 wherein said aluminum is in the form of a coiled wire.

33. The method of claim 25 wherein the melt is contacted with the aluminum metal for from about 1/4 to about 1 hour.

34. A method of manufacturing purified lithium aluminum chloride which comprises the steps of:
   a. heating an admixture of impurity-containing lithium chloride and aluminum chloride at a temperature above the melting point of lithium aluminum chloride to form a melt of lithium aluminum chloride;
   b. passing hydrogen chloride gas through the said melt for a time of up to about 15 minutes to remove at least a portion of any oxygen-containing impurities present therein;
   c. passing chlorine gas through the melt while heating the melt to a temperature of from about 425° to about 540° C and maintaining the melt at the said temperature with chlorine gas flowing therethrough for a time of from about 2 minutes up to about 1 hour until said melt is clarified;
   d. cooling said clarified melt to a temperature of from about 160° to about 260° C while maintaining the chlorine gas flowing therethrough;
   e. stopping the flow of and removing of chlorine gas;
   f. flowing argon or neon gas through the said cooled, clarified melt to remove at least a portion of any volatile impurity present therein and contacting said melt while said argon or neon gas is flowing therethrough with aluminum metal for a time sufficient to remove impurities therefrom and;
   g. cooling the said purified lithium aluminum chloride in an inert atmosphere.

35. The method of claim 34 wherein said clarified melt after the chlorine gas has been stopped is subjected to a vacuum sufficient to remove at least a portion of any volatile impurity present therein.

36. The method of claim 35 wherein said aluminum metal is in the form of a coiled wire.

37. A process for making purified lithium aluminum chloride which comprises the steps of:
   a. heating an admixture of about 1:1 molar ratio of lithium chloride and aluminum chloride to a temperature above the melting point of lithium aluminum chloride to form a melt of lithium aluminum chloride, said molten lithium aluminum chloride having oxygen-containing, water, carbon and iron impurities contained therein;
   b. passing hydrogen chloride gas through the molten lithium aluminum chloride to convert at least a portion of the oxygen-containing impurities to water and volatile impurities and to remove at least a portion of the water and volatile impurities by scrubbing;

c. heating said molten lithium aluminum chloride to a temperature of from about 425° to 540° C while passing chlorine gas therethrough to remove at least a portion of the carbon impurities contained therein;

d. cooling said resulting molten lithium aluminum chloride to a temperature of from about 160° to 250° C;

e. evacuating the atmosphere surrounding the said molten lithium aluminum chloride and passing argon or neon gas through the molten lithium aluminum chloride to remove at least a portion of volatile impurities contained therein;

f. repeating the steps of evacuating the atmosphere surrounding said molten lithium aluminum chloride and passing the argon or neon gas therethrough until substantially all the dissolved gases contained therein are removed;

g. contacting said molten lithium chloride with aluminum metal to remove at least a portion of the iron impurities; and h. cooling the purified lithium aluminum chloride.

38. A process for making purified lithium aluminum chloride which comprises the steps of:

a. heating an admixture of about 1:1 molar ratio of lithium chloride and aluminum chloride containing oxygen-, water, carbon and iron impurities to a temperature above the melting point of lithium aluminum chloride to form a melt of lithium aluminum chloride having oxygen-containing, water, carbon and iron impurities contained therein;

b. passing hydrogen chloride gas through the molten lithium chloride to convert at least a portion of the oxygen-containing impurities to water and volatile impurities and to remove at least a portion of the water and volatile impurities by scrubbing;

c. evacuating the atomsphere surrounding the molten lithium aluminum chloride to remove volatile impurities;

d. heating said molten lithium aluminum chloride to a temperature of from about 480° to 540° C for a time of from about 2 minutes up to about 1/2 hour while passing chlorine gas therethrough to remove at least a portion of the carbon impurities contained therein;

e. cooling said resulting molten lithium aluminum chloride to a temperature of from about 160° to about 250° C;

f. evacuating the atmosphere surrounding the said molten lithium aluminum chloride and then passing argon or neon gas through the molten lithium aluminum chloride to remove at least a portion of volatile impurities contained therein;

g. repeating the steps of evacuating the atmosphere surrounding the molten lithium aluminum chloride and passing the argon or neon gas therethrough until substantially all the dissolved gases contained therein are removed;

h. containing said lithium aluminum chloride with aluminum metal in the form of aluminum foil to remove at least a portion of the iron impurities;

i. filtering said purified lithium aluminum chloride to remove any solid impurities contained therein; and, j. cooling the resulting purified lithium aluminum chloride.

* * * * *